Patented Oct. 9, 1951

2,570,734

UNITED STATES PATENT OFFICE 2,570,734

STABLE HISTIDINE ASCORBATE

Alphonse Walti, Westfield, N. J., assignor to Interchemical Corporation, New York, N. Y., a corporation of Ohio No Drawing. Application December 30, 1948, Serial No. 68,376

2 Claims. (Cl. 260—309)

This invention relates to the preservation of histidine ascorbate.

The use of histidine in conjunction with ascorbic acid has become important remedially after the discovery that histidine changes in vivo into histamine through the action of ascorbic acid. The organism can thus be supplied with material amounts of histamine without the occurrence of shock and without the histamine being destroyed too rapidly, which is important in combatting periphervascular disease, for instance. However, the efficiency of producing in this manner increased amounts of histamine within the organism is impaired because solutions of the ascorbic acid and of the histidine must be injected separately, the former intravenously in form of sodium ascorbate, usually followed by intramuscular injection of a histidine monohydrochloride solution. This procedure is required because of the instability of the combined solutions. Due to oxydation-reduction processes which are said to occur under the influence of light and heat and which are accelerated by the presence of air, histidine ascorbate solutions deteriorate rapidly and ordinarily cannot be used for the above mentioned purpose. Mixtures of sodium ascorbate and histidine monohydrochloride are just as instable.

One way of overcoming this difficulty and of producing stable solutions of histidine and ascorbic acid is claimed in U. S. Patent 2,134,246 of October 25, 1938. According to this disclosure a stable ascorbic acid-histidine solution may be prepared by dissolving histidine and ascorbic acid in water which has been de-aerated and through which a current of cool nitrogen is continuously passed. The solution may then be filled into ampoules containing nitrogen, or the ampoules may be evacuated after filling.

However, the content of the ampoules remains susceptible to some destructive changes under the influence of heat. Such ampoules, after sterilization, exhibit various degrees of coloration and their applicability for injecting purposes appears to be limited.

The present disclosure embodies a different method of preserving histidine ascorbic and it is the object of the herein claimed invention to provide, at a great latitude of concentration and at a desirable pH for intravenous injection, stable histidine ascorbate which may be stored indefinitely and which is instantaneously ready for use.

I have discovered that solutions of ascorbic acid to which histidine has been added may be dehydrated from the frozen state and rendered stable in this manner if specific limitations are observed. The ratio of combining the ascorbic acid with the histidine in the solution is essential. It determines not only the success or failure of the lyophilization but also the pH of the material after redissolving, which is important for intravenous use. Solutions of ascorbic acid and histidine base at equimolar proportions, which have a pH of about 5, are difficult to lyophilize. Any material increase in the relative amount of ascorbic acid precludes altogether the dehydration from the frozen state. Conversely, the efficiency of the dehydration improves when the relative amount of histidine base is increased. Thus, I found that a solution containing 2.3 mols histidine base per one mol ascorbic acid can be desiccated from the frozen state without difficulties. The operation reaches top efficiency with a solution containing about 3.4 mols histidine per one mol ascorbic acid. Concurrently with the presence of more histidine the pH of the solution rises. It reaches 6.5 after adding about 3.4 mols of histidine to a solution containing 1 mol of ascorbic acid. Although a somewhat higher acidity does not necessarily prevent the intravenous use of the solution, the pH value of, say, 6.5 is more desirable. If, however, the pH is raised to 6.5 by means of sodium hydroxide, the solution is again difficult to dehydrate. For the same reason solutions of sodium ascorbate and histidine monohydrochloride do not lend themselves to a dehydration from the frozen state.

The concentration of the histidine-ascorbic acid solutions is limited by the relative amount of histidine present at a given temperature. The following table depicts safe concentration maxima at 25° C.

| Molecular Ratio | | Total Solute in 100 cc. $H_2O$ |
|---|---|---|
| Histidine | Ascorbic Acid | |
| | | Gr. |
| 0 | 1 | 33 |
| 1 | 0 | 4 |
| 1 | 1 | 100 |
| 2 | 1 | 13 |
| 3.4 | 1 | 7 |

Thus, 35.2 gr. (0.2 mol) ascorbic acid and 105.5 gr. (0.68 mol) histidine base give a 6.6% solution in 2,134 cc. of water. The solution has a pH of 6.5. If the water has been boiled to remove air and if the materials are dissolved at reasonable expediency, no special precautions such as passing a current of nitrogen through the water, are needed for purpose of this invention. However, if the preparation is to be used for injections, precautions must be taken to assure sterility. For this purpose, I dissolve the ascorbic acid in one portion of water and the histidine base in another portion of the water and sterilize them separately. For example: I dissolve the 35.2 gr. ascorbic acid in 200 cc. of water and the 105.5 gr. of histidine base in 1,810 cc. of water. Both solutions may be sterilized by sterile filtration. I prefer to sterilize the histidine solution by autoclaving in bulk or subdivided in individual ampules, say 7 cc. ampules, each containing 0.2 gr. of histidine in 3.4 cc. of water, to which is added the sterile solution of 0.066 gr. of ascorbic acid in 0.36 cc. of water by aseptic technique. The containers are then immediately shelled, that is, they are exposed to low temperature and rotated in a substantial horizontal position until the solution is frozen in form of a shell covering the inside walls. The material is then desiccated from the frozen state in the known manner. After the moisture content has been reduced to 2% and less, the containers are vacuum sealed and are ready for use.

One convenient way of restoring the desiccated material to solution form is to pierce the seal of the container with a sterile transfer needle which is connected to a bottle of sterile water. The vacuum performs the transfer of the water which readily penetrates into the interstices of the sponge-like lyophilization product, redissolving it instantaneously. Within the limits imposed by the size of the bottle and the solubility of the product the concentration of the solution can be varied at will with the amount of water entering the bottle.

I claim:

1. The process for the manufacture of stable histidine ascorbate, which comprises dissolving 1 mol equivalent of ascorbic acid in one portion of water, dissolving 3.4 mol equivalents of histidine base in another portion of water, regulating the concentration of the solutions in such a manner that upon combining a solution of not more than 7 per cent results, sterilizing the two solutions, cooling, combining them aseptically into sterile containers, freezing the combined solution in form of a shell inside of the containers, and dehydrating from the frozen state.

2. As a stable product having a pH of 6.5 upon redissolving, the composition made in accordance with claim 1.

ALPHONSE WALTI.

REFERENCES CITED

The following references are of record in the file of this patent:

UNITED STATES PATENTS

| Number | Name | Date |
|---|---|---|
| 1,509,916 | Waite | Sept. 30, 1924 |
| 1,970,194 | Riebel, Jr. | Aug. 14, 1934 |
| 2,134,246 | Elger | Oct. 25, 1938 |
| 2,176,041 | Pittenger | Oct. 10, 1939 |

OTHER REFERENCES

Flosdorf et al.: Journal of Immunology, vol. 50 (1945), pp. 21 to 54, especially p. 45.